Nov. 24, 1925.
W. McBURNETT
SPRING WHEEL
Filed Dec. 19, 1923
1,562,512
2 Sheets-Sheet 1
Fig. 1.
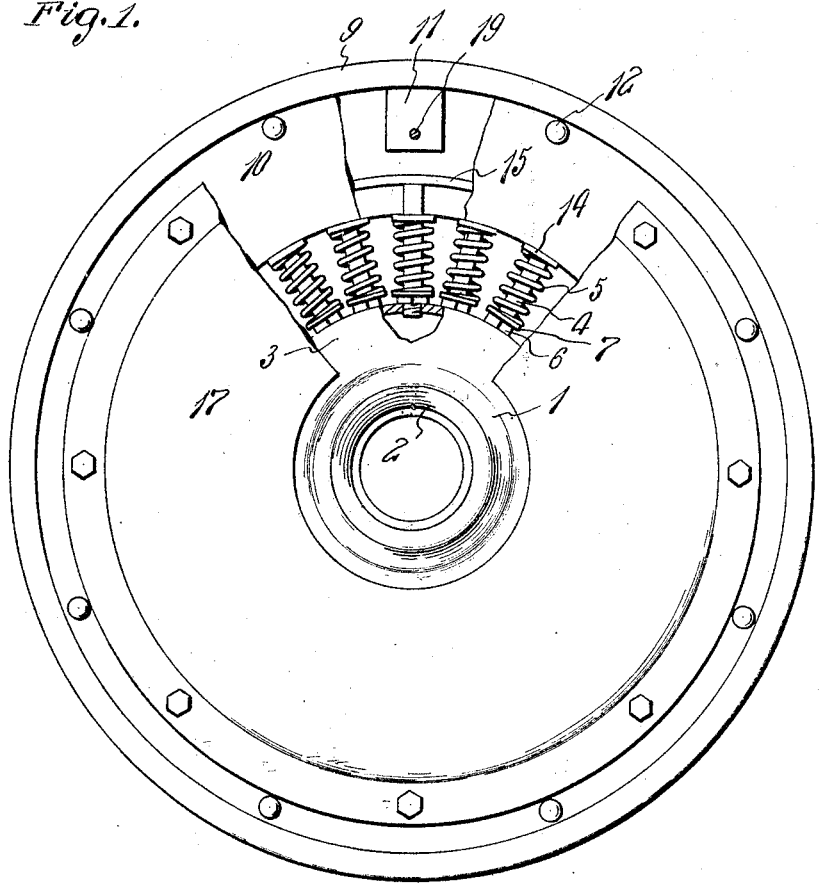
Fig. 5.
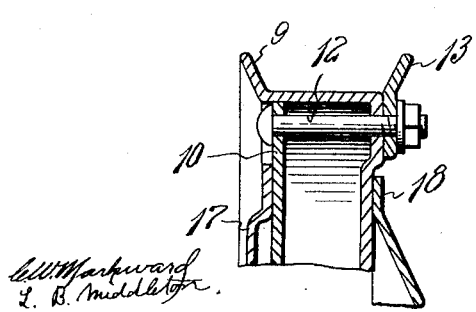
Fig. 6.
W. McBurnett
INVENTOR
BY Victor J. Evans
ATTORNEY
WITNESS:

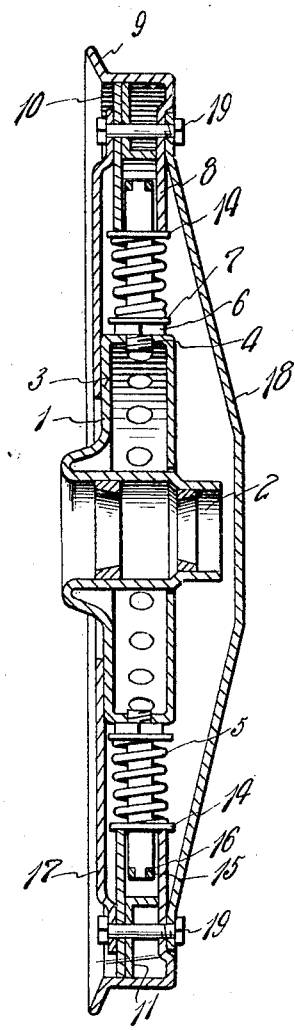

Patented Nov. 24, 1925.

1,562,512

UNITED STATES PATENT OFFICE.

WESLEY McBURNETT, OF BATON ROUGE, LOUISIANA.

SPRING WHEEL.

Application filed December 19, 1923. Serial No. 681,624.

*To all whom it may concern:*

Be it known that I, WESLEY MCBURNETT, a citizen of the United States, residing at Baton Rouge, in the parish of East Baton Rouge and State of Louisiana, have invented new and useful Improvements in Spring Wheels, of which the following is a specification.

This invention relates to a spring wheel, the general object of the invention being to provide a plurality of springs for yieldingly supporting a rim section so that the springs will absorb shock and improve the riding qualities of the vehicle.

Another object of the invention is to make the wheel entirely of metal.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the improved wheel.

Figure 2 is a diametral sectional view.

Figure 3 is a sectional view through one of the cover plates.

Figure 4 is an edge view of the ring 15.

Figure 5 is an enlarged sectional view through the rim portion of the wheel.

Figure 6 is an end view of one of the bolts 4.

In these views, 1 indicates the hub section which is formed of a metal plate bent to form the hub part 2 and the annular part 3 which is of channel shape in cross section. The outer circumference of the part 3 has screw threaded holes to receive the threaded ends of the bolts 4 on which the springs 5 are arranged. Adjusting nuts 6 are arranged on the bolts and washers 7 are placed on the nuts and form seats for the springs. The rim section consists of an annular plate 8, having its outer part bent to form the rim 9 which receives the tire carrying rim, the ring-shaped plate 10 and the angle plates 11 which space the parts 8 and 10, bolts 19 passing through the parts 8, 10 and 11. The bolts also hold in place the rear disk 17 and the front disk 18 which act as covering means for the parts. The angle plates 11 are of small construction and one of these plates is used with each bolt 19. Bolts 12 are used to hold the lugs 13 on the device, these lugs holding the tire rim on the rim 9. The inner circumferences of the parts 8 and 10 form shoulders for supporting the washers 14 which form seats for the outer ends of the springs, the bolts 4 extending into the space formed by the parts 8 and 10 and the outer ends of the bolts are connected together by the ring 15 which has elongated openings 16 therein for receiving the outer ends of the bolts which are similarly shaped.

From the above it will be seen that the rim section is yieldingly supported from the hub section by the springs so that shocks are absorbed by the springs. The parts are easily accessible and they are kept free of dirt and dust by the covering discs.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wheel of the class described comprising a hub section, radiating bolts carried thereby, a rim section, consisting of a pair of annular plates, spacing plates between the first mentioned plates and bolts connecting the plates together, one of the annular plates having its outer part bent to form a rim receiving part, the outer ends of the radiating bolts extending between the annular plates at the inner edges, springs on said bolts, placed between the hub section and the rim section and front and rear discs fastened to the rim section.

In testimony whereof I affix my signature.

WESLEY McBURNETT.